United States Patent [19]
Deane

[11] Patent Number: 5,533,475
[45] Date of Patent: Jul. 9, 1996

[54] ENGINE AND GEAR DRIVE COMBINATION

[75] Inventor: Daniel Deane, Peterborough, Great Britain

[73] Assignee: Perkins Limited, Cambridgeshire, Great Britain

[21] Appl. No.: 295,840

[22] PCT Filed: Feb. 12, 1993

[86] PCT No.: PCT/GB93/00301

§ 371 Date: Aug. 24, 1994

§ 102(e) Date: Aug. 24, 1994

[87] PCT Pub. No.: WO93/17226

PCT Pub. Date: Sep. 2, 1993

[30]    Foreign Application Priority Data

Feb. 24, 1992 [GB]   United Kingdom .................. 9203921

[51] Int. Cl.[6] .................................................. F02B 77/00
[52] U.S. Cl. ..................... 123/198 C; 123/90.15
[58] Field of Search .......................... 123/198 R, 198 C, 123/90.15, 90.17; 475/331

[56]           References Cited

U.S. PATENT DOCUMENTS

| 4,305,352 | 12/1981 | Oshima et al. | 123/90.15 |
| 4,747,375 | 5/1988 | Williams | 123/90.15 |
| 5,174,253 | 12/1992 | Yamazaki et al. | 123/90.17 |

FOREIGN PATENT DOCUMENTS

| 2628680 | 12/1977 | Germany | 123/198 R |

*Primary Examiner*—Noah P. Kamen
*Attorney, Agent, or Firm*—Nilles & Nilles

[57]           ABSTRACT

A variable timing gear device for an engine component driven by a drive system from the engine drive shaft. The gear device comprises an epicyclic or differential gear mechanism, an input of which is driven from the engine drive shaft and an output being connected to the driven shaft of the component. The device allows the drive speed between the input and output to be varied. The device may include means for varying the phase relationship between the engine drive shaft and the driven shaft of the component.

29 Claims, 8 Drawing Sheets

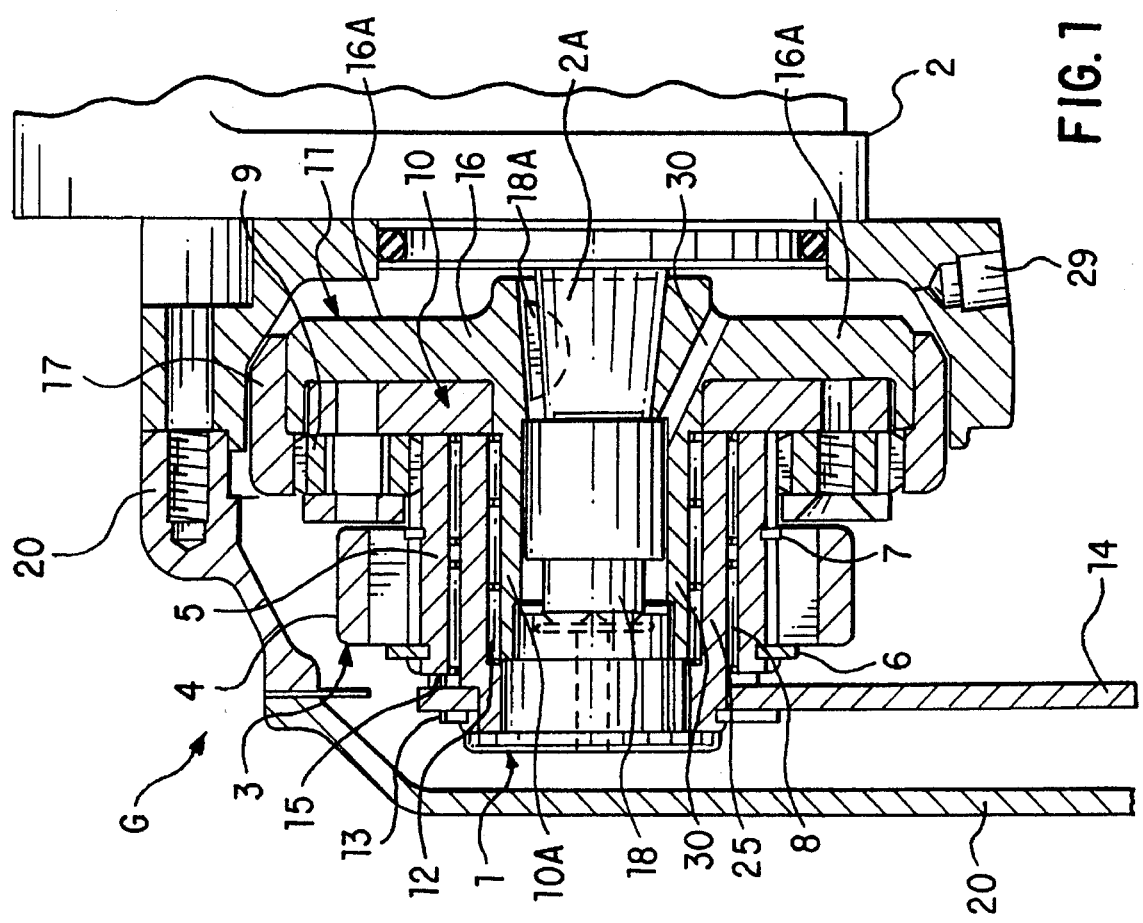

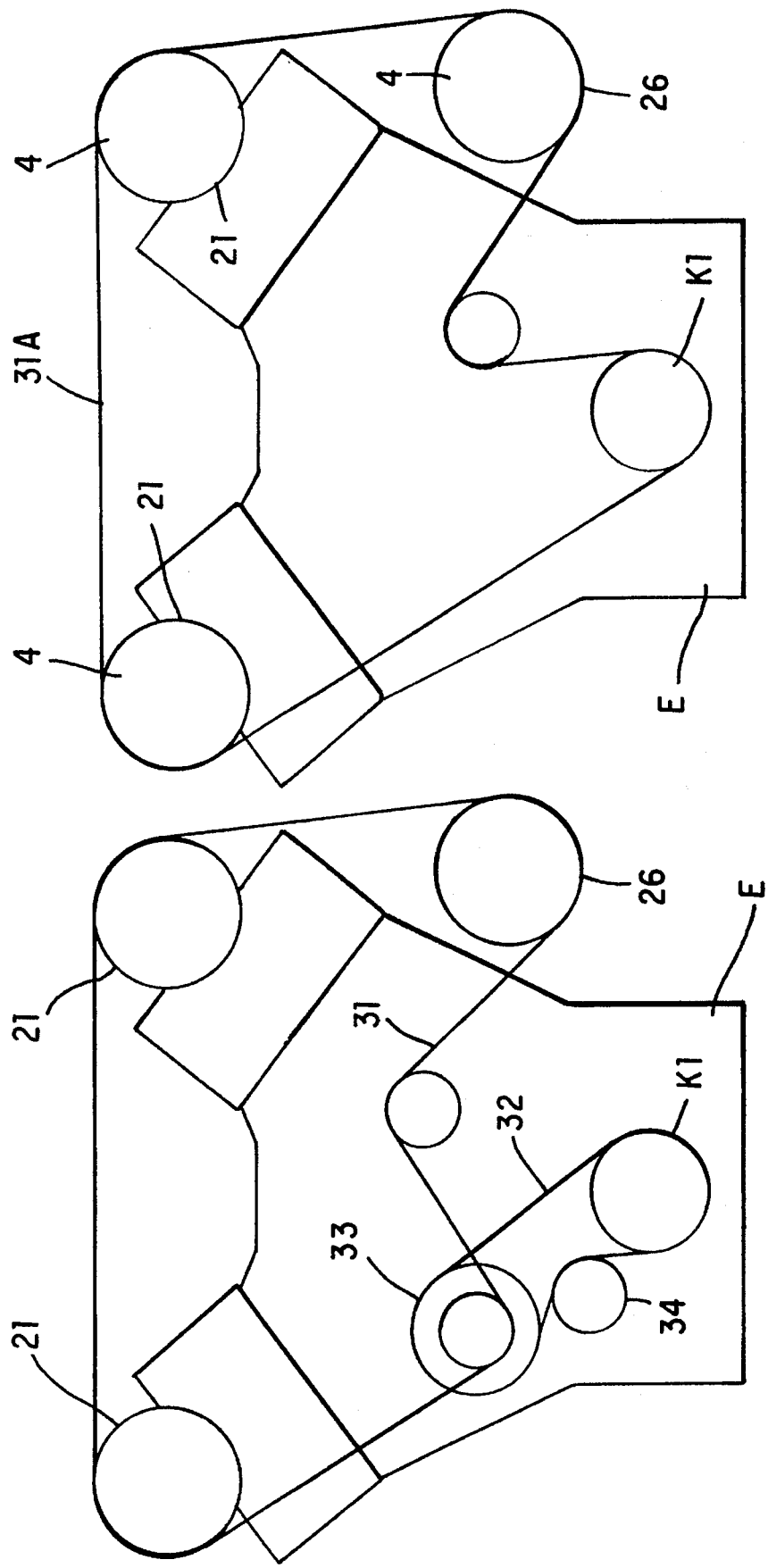

ENGINE AND GEAR DRIVE COMBINATION

BACKGROUND OF THE INVENTION

1. Field of the Invention

The present invention relates to an engine and gear drive combination.

2. Discussion of the Related Art

In internal combustion engines a variety of components including auxiliaries are driven from the crankshaft, the drive nowadays usually being via a belt or chain (both referred to as a belt for convenience) from a crankshaft sprocket or drive wheel. Some of these components, such as the camshafts and fuel injection pumps (for a diesel or fuel injection engine) are termed low-speed components as they are driven at less than crankshaft speed, specifically half-speed for a 4-stroke engine, while others, for example the water pump and alternator are high-speed components being driven above crankshaft speed. These different speed requirements have necessitated the provision of two separate drive belt systems, one for the low-speed components and the other for the high-speed components, as the crankshaft sprocket or wheel for the low-speed system, having to be relatively small, would not be suitable for the high speed system.

The use of two timing systems causes an increase in the length of the engine making it less compact, and additionally there are increased maintenance requirements as the tension in each belt system will have to be adjusted individually and eventual replacement of both belts may be needed. The slow speed belt can have a tensioner device while the alternator of the high speed belt can be movable for belt tensioning.

Further, the speed reduction at the engine camshaft has meant that relatively large camshaft drive wheels (or sprockets) are needed, leading to an increased height of the engine (for an overhead camshaft design) thereby causing possible problems in installing the engine below an engine head or bonnet. The problem may be mitigated by altering the valve angles but this may adversely affect engine performance.

Additionally, in engine designs up until now, it has been customary to operate with set (fixed) valve timing and fuel injection timing relative to a crankshaft datum. This, however, is not conducive to optimum engine performance for running over a range of different operating and load conditions on the engine. There have been proposals previously for phase adjustment in these timings during engine running but these have proved over complex and/or ineffective.

OBJECTS AND SUMMARY OF THE INVENTION

It is an object of the present invention to provide an engine and gear drive combination which will obviate the above problems.

According to one aspect of the present invention, there is provided an engine and gear drive combination including a gear device for an engine component driven by a drive system from the engine drive shaft, said gear device being adapted for location in said drive system and means being provided to locate the gear device close to said component, the gear device comprises an input element driven from the engine drive shaft and an output element coupled to a driven shaft of the component. The gear device serves to step the drive speed between the input and output elements, and one of said input or output elements comprises a sunwheel assembly while the other comprises an annulus gear. The sunwheel assembly and the annulus gear ar connected by planet gears mounted on a planet carrier, the planet carrier having a control means including a lever for providing angular adjustment between the sunwheel assembly and annulus gear. The the lever is connected to the planet carrier and angular adjustment between the sunwheel assembly and annulus gear is effected by movement of the lever in a direction normal to the axis of rotation of the planet carrier.

Preferably, the gear drive operates in a step-down mode.

In a preferred embodiment, the planet carrier is mounted on a sleeve extending concentrically with the driven shaft of the component and away from the component.

Preferably, operation of the lever is effected by sensing means sensing operating parameters of the engine.

Preferably, the annulus gear comprises a hub having a radial member to which an annulus is attached, the hub being adapted to be secured to the driven shaft of the component. Alternatively, the annulus gear can be secured to a radial member integral with said driven shaft of the component.

Preferably, the gear device is arranged such that the lever of the control means connects with the planet carrier at a position close to the front of the gear device.

Preferably also, the lever of the control means is connected to a sleeve of the planet carrier.

The present invention also includes an engine and gear drive combination in which the engine is an internal combustion engine.

According to a further aspect of the present invention there is provided an internal combustion engine including a number of low-speed engine components consisting of at least one of a camshaft or a fuel injection pump, and a number of high-speed engine components consisting of at least one of a water pump or an alternator, wherein all of said components are driven from the engine drive shaft through a single belt drive means and either the low-speed components or the high-speed components are each provided with an additional gear device to alter their input speed from that imparted by the belt drive means.

BRIEF DESCRIPTION OF THE DRAWINGS

Embodiments of the present invention will now be described by way of example with reference to the accompanying drawing wherein:—

FIG. 1—shows in sectional side elevation a variable timing gear device according to the present invention, as applied to an engine component;

FIG. 7—shows schematically a front view of a prior art I.C. engine showing the timing belt drives of various components, while

FIGS. 9 and 10—show similar views to that of FIGS. 7 and 8 but for a V-type engine;

DETAILED DESCRIPTION OF THE DRAWINGS

Figure 2:
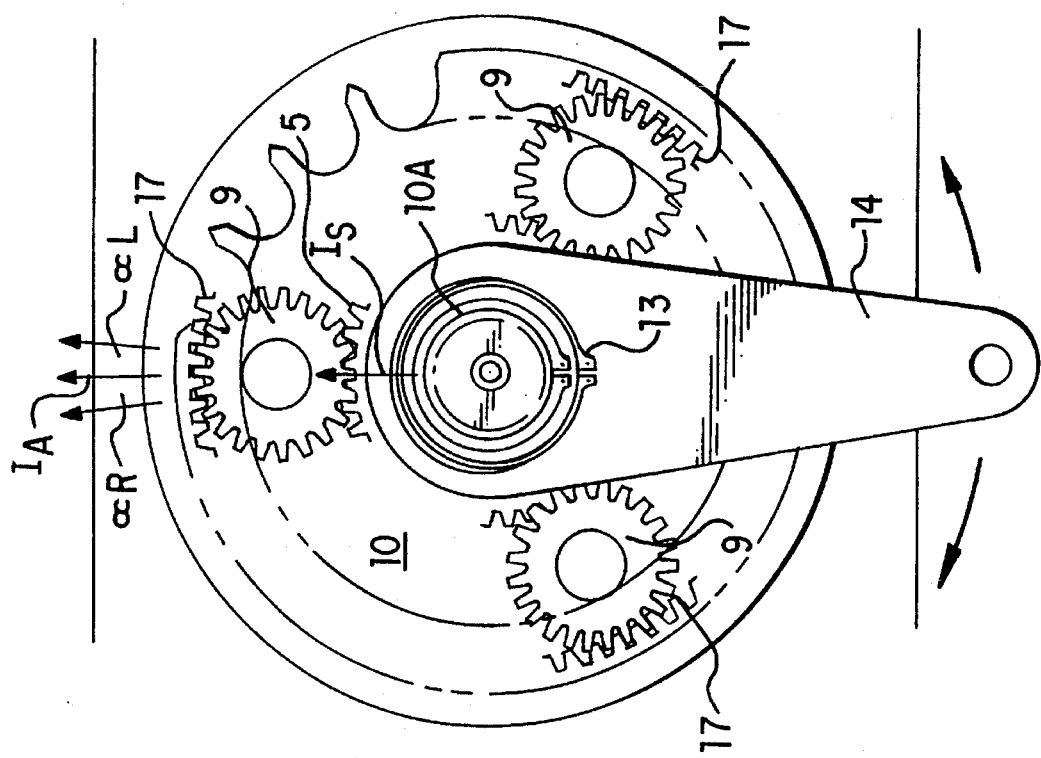
FIG. 2—shows a front view of the gear device.

Referring to FIGS. 1 and 2, a variable timing gear device G is provided for a component of an I.C. engine, in particular for an engine fuel injection pump or for the engine camshaft for valve timing, and serves to provide a step-down gear function.

The device G comprises a simple epicyclic drive 1 driving a driven shaft 2A of the component so that the device G lies close to a casing wall 2 of the component, the epicyclic drive 1 being driven by the timing gears mounted on the front of the engine (not shown) and enclosed in a sealed timing case 20.

The drive to the shaft 2A is through a sunwheel assembly 3 which comprises an outer drive gear 4, inner gear 5 and circlips 6 and 7 to keep the gear 5 in its proper axial position. As an alternative, the sunwheel assembly may have a unit construction outer and inner gear in which case the circlips will not be required.

The sunwheel assembly 3, which is supported by bearings 8, drives planet gears 9 mounted on a carrier 10. Motion to the shaft 2A is effected by the annulus gear 11 attached directly to the shaft 2A and driven by the planet gears 9.

The carrier 10 includes a sleeve 10A which is mounted on the annulus gear and supported by bearings 12. The carrier 10 is axially located by circlips 13, lever 14 (to be explained) and thrust washer 15.

The annulus gear 11 consists of an inner hub 16 having a radial wall 16A with a shrunk on ring gear 17. The annulus gear is bolted directly to the shaft 2A by a nut 18, a key 18A being provided between the hub 16 and the shaft 2A.

The angular relationship of the shaft 2A to the sunwheel assembly 3 can be manipulated by an adjusting lever 14 which is attached to the sleeve 10A of the carrier.

Actuation of the lever 14 can be effected by any suitable device, such as a pneumatic or hydraulically operated actuator or the electrical linear actuator 19 shown in FIG. 5, in a control arrangement which will be described in greater detail later. Referring to FIG. 2, with carrier 10 stationary there will be a straight speed reduction (step-down) between the sunwheel assembly 3 and the annulus gear 11 and the datum indicators $I_S$ and $I_A$ for the sunwheel and the annulus will be aligned, $I_S$ being set precisely with regard to a crankshaft datum. However, if a selected movement is now imparted to the lever 14, creating movement in the carrier 10, the annulus gear 11 will be caused to lead ($\alpha_L$) or lag ($\alpha_R$) the sunwheel assembly 3 by a small desired amount, dependent on the direction of swing of the lever 14. The lever 14 may be provided with swinging movements up to 90°, but usually about 10° should be sufficient.

Figure 3:
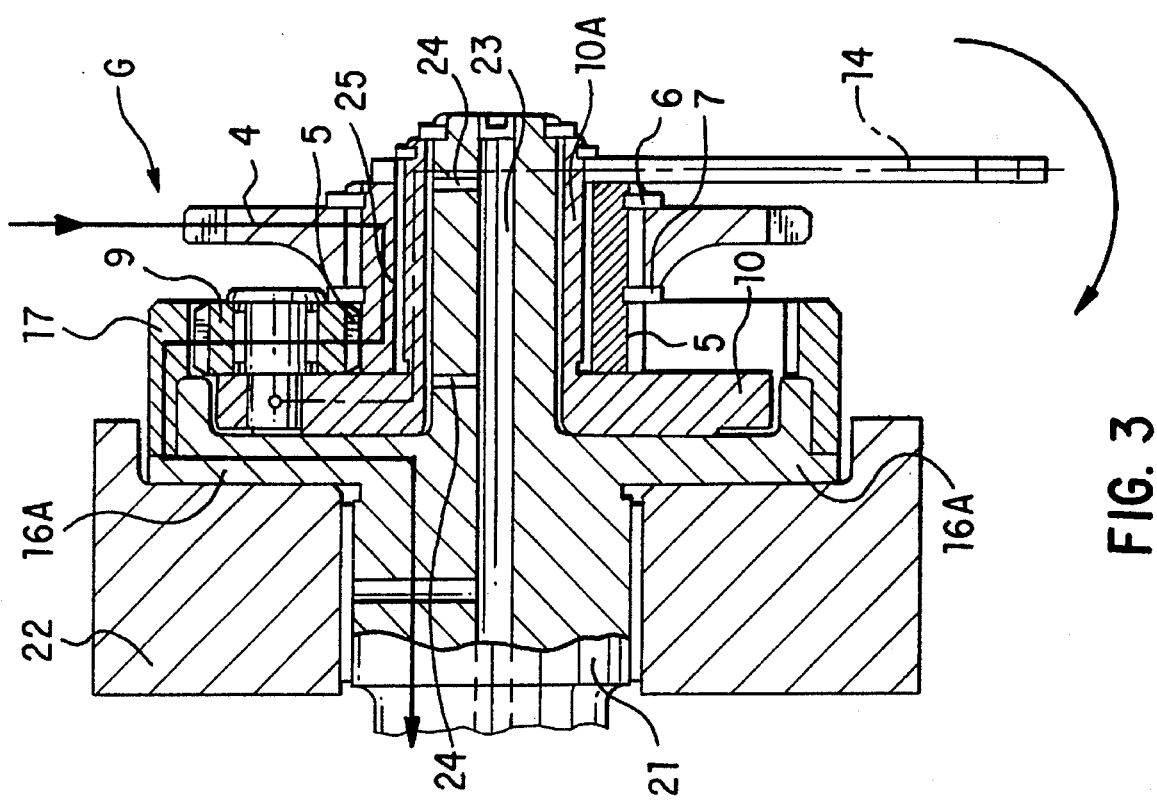
FIG. 3—shows in side elevation the gear device in FIG. 1 applied in an engine camshaft.

FIG. 3 shows a gear device G in accordance with FIG. 1 utilised in an engine camshaft 21—similar references are used as in FIG. 1. In this case, the radial wall 16A of the annulus gear 11 is integral with the camshaft 21, the wall 16A being located close to a camshaft support block 22 mounted on the engine cylinder head (not shown). Lubricating oil for the epicyclic gear 1 is taken from the oil gallery 23 of the camshaft via ducts 24 and 25. The drive through the epicyclic gear 1 is shown in thick arrowed-lines in FIG. 3.

Selected adjustment of the valve timing through the camshaft of the lever 14 enables the engine to approach optimum performance during running for varying load and operating conditions of the engine.

Figure 4:
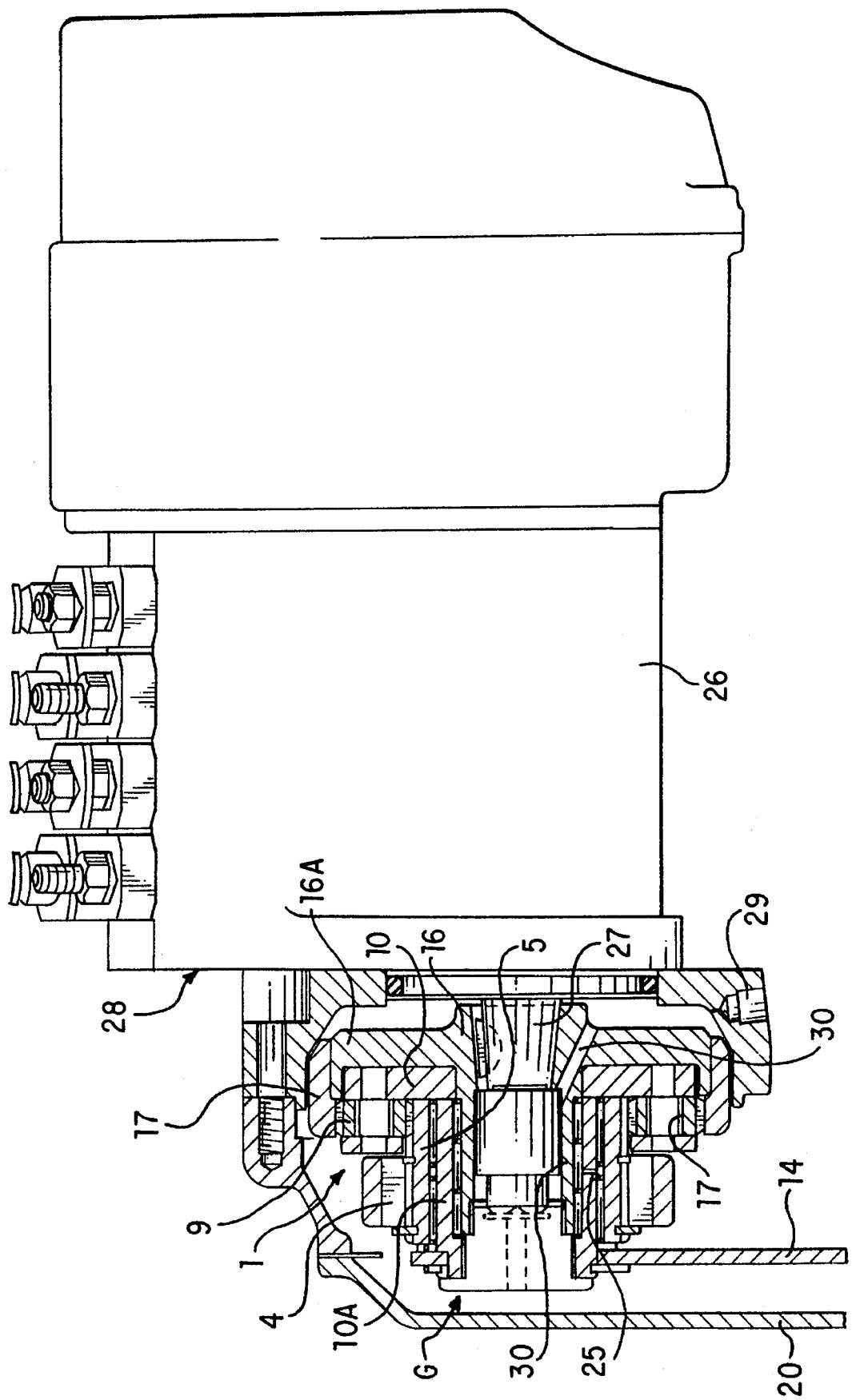
FIG. 4—shows a side view of a fuel injection pump of an i.c. engine, provided with the gear device (shown in section) of the present invention.
Figure 5:
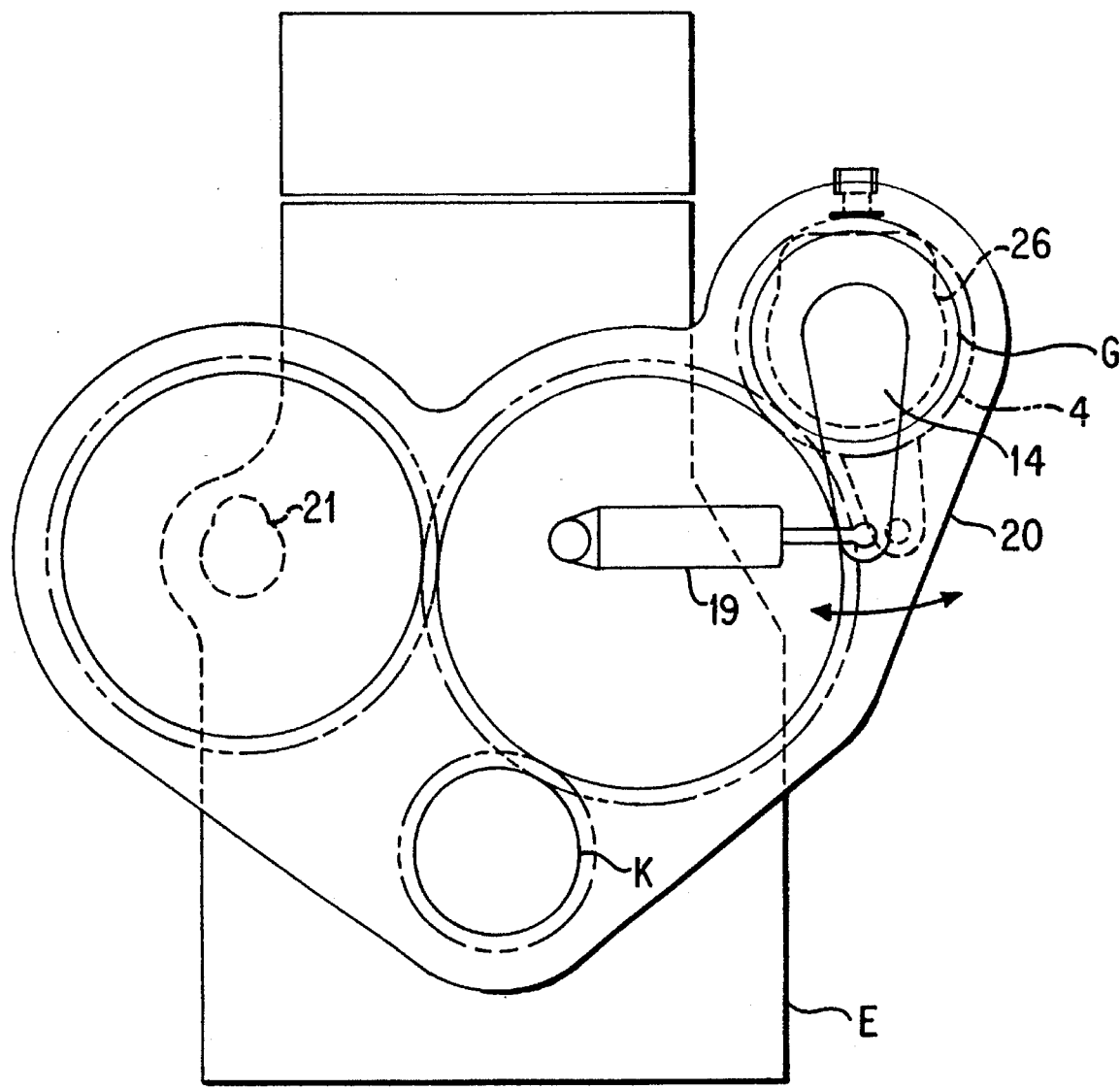
FIG. 5—shows a front view of an i.c. engine fitted with the fuel pump as shown in FIG. 4.

FIG. 4 shows the gear device G fitted on the injection pump 26 of a diesel engine, the location of the pump 26 on the engine E, being shown in FIG. 5. In this case, the gear G is exactly in accordance with FIG. 1, with the hub 16 fixed directly onto an external stub portion 27 of the pump shaft so that the gear is positioned close to an end casing wall 28 of the pump. Lubrication to the epicyclic gear 1 can be via nozzle input 29 and duct 30.

The position of the lever 14 is controlled by an electrical linear actuator 19 (FIG. 5) connected to the timing case cover 20. The actuator is connected to a 'black box' and powered by the vehicle battery.

The actuator 19 positions the lever 14 as required up to 90° swing.

The 'black box' monitors a number of engine operating parameters and sends a signal to the electrical actuator 19 to change the timing of fuel injection so as to be appropriate to the desired operating condition.

The device provides accurate control of the angular relationship between the engine crankshaft and the fuel injection pump 26.

This pump 26 is responsible for entering the supply of fuel to the injector atomisers. Without some form of timing control device, the relationship between the engine crankshaft and the instant that the fuel is injected into the combustion space is purely dependent upon the hydromechanical characteristics of the fuel system.

By incorporating this timing device G it is possible to optimise the instant of injection with respect to many parameters, such as speed, load, air temperature, water temperature, throttle position etc. thus enabling enhanced engine performance characteristics to be achieved.

Figure 6:
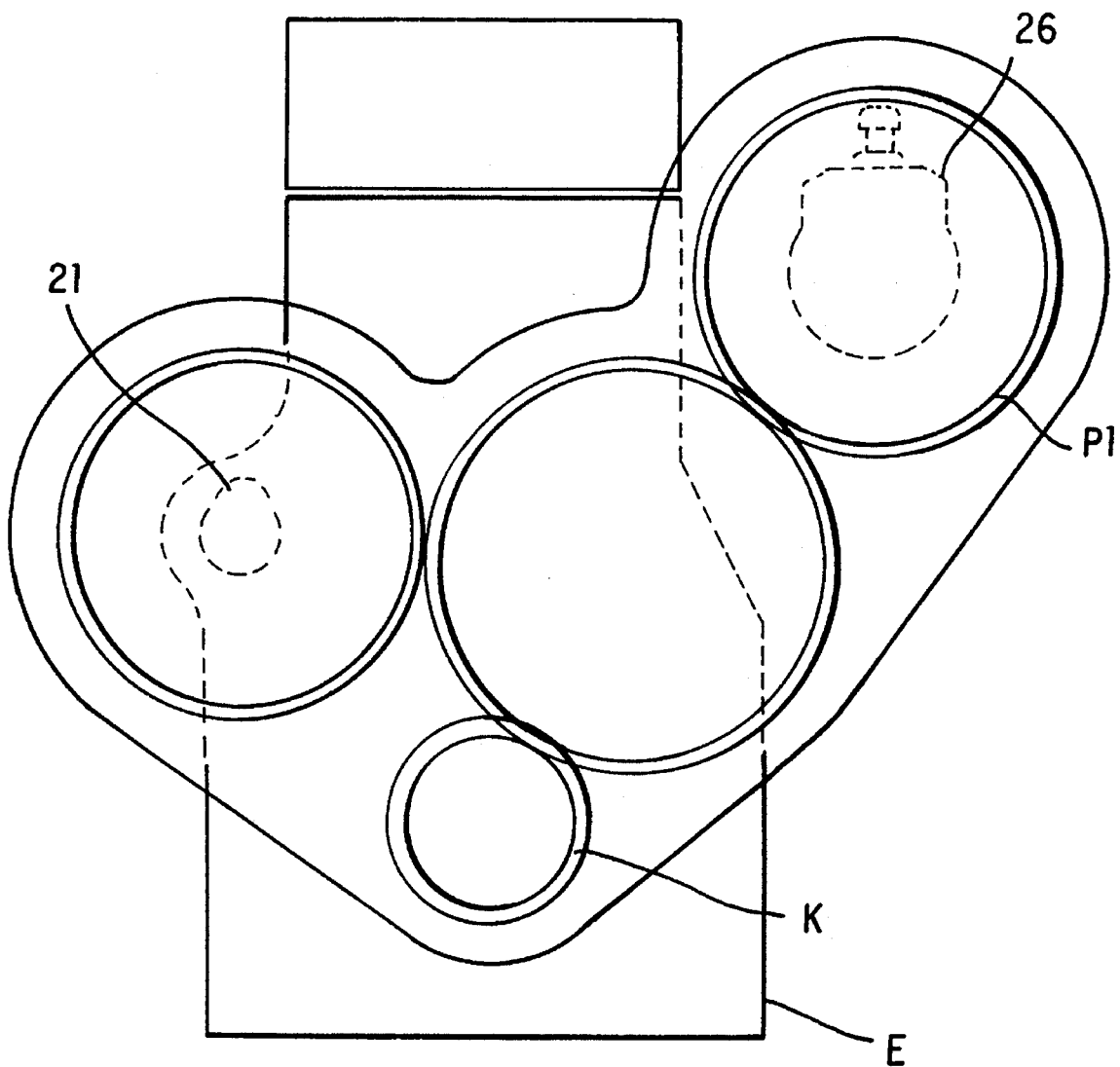
FIG. 6—shows a front view of a similar, but prior art engine to that of FIG. 5.

Due to the step-down ratio provided by the epicyclic gear 1, the input gear (4) of the pump 26 can be of smaller size (e.g. 34 tooth) compared to the prior art arrangements shown in FIG. 6 where this input gear P1 has 56 teeth: this enables a reduction in the overall width of the engine. FIGS. 5 and 6 show the crankshaft gear K driving the input gear of the pump 26 via an idler gear.

By having the timing control through the sleeve 10A of the carrier with the control lever 14 extending downwardly parallel to the engine, the overall diameter of the gear device G can be kept at a minimum thereby giving a compact device. The lever 14 is positioned close to the front of the epicyclic gear 1.

The use of varying speed devices for engine components can provide considerable improvements in the layout of the engine as will now be explained.

The fact that there is a speed step-down from the input drive at the sunwheel assembly 3 to the annulus gear 11 connected to the fuel pump shaft or camshaft, enables the basic layout of the front end belt/gear/chain of an engine to be simplified.

Figure 8:
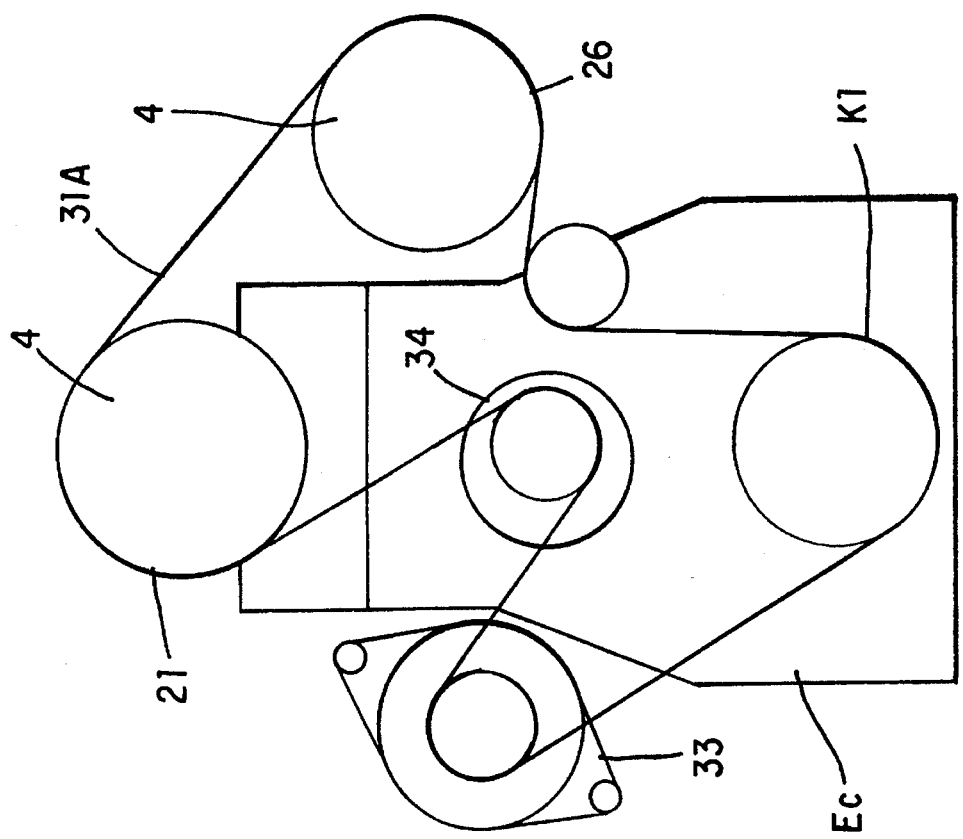
FIG. 8 shows the same view of the engine but using devices of the present invention.
Figure 7:
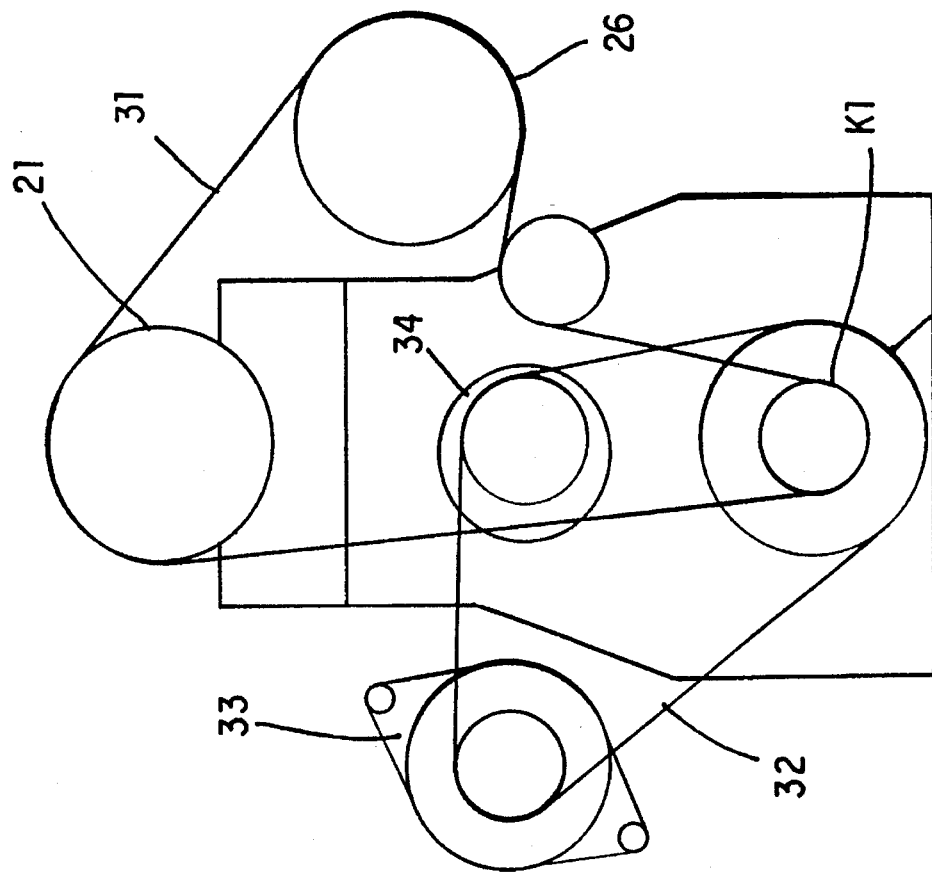

FIGS. 7 and 8 show an engine having a single overhead camshaft, fuel injection pump both with variable timing, plus an alternator and water pump drive.

Thus on a conventional drive (FIG. 7) it is usual to have one drive belt or system 31 to drive low speed components such as fuel injection pumps 26 and camshafts 21, which run at half engine speed, and another 32 for high speed components, e.g. alternators 33, water pumps 34, which run at higher than engine speed, the drive being from the crankshaft pulley wheels or sprockets $K_1$, $K_2$.

From examination of FIG. 7 it can be seen that the crankshaft pulley/gear/sprocket etc. has to be small in diameter in order that the camshaft or fuel injection pump pulley/sprocket (at twice the diameter of the crankshaft pulley) can be of reasonable size. On a four stroke diesel engine the camshaft and fuel injection pump run at half crankshaft speed.

Shortcomings stem from the small size of crankshaft pulley $K_1$ in that the capacity to drive more components is limited, and the belt/chain speed is too low to drive the high speed components without employing impractically small pulleys/sprockets on these components.

Thus it is normal to have an additional drive system 32 as shown where the alternator 33 serves as a tensioner.

The same layout with the variable timing devices allows the crankshaft pulley K1 to be enlarged so that all components can be driven on a single drive system 31A as shown in FIG. 8. Although the fuel injection pump and camshaft drive pulley/sprocket 4 will be operating at a much higher speed in this case, the correct ratio of 1:2 is recovered by the speed step-down facility within the variable timing device provided at these items.

With the single drive system shown in FIG. 8, there is only one tensioner required and the alternator 33 can be fixed, allowing it to be positioned closer to the engine cylinder block E. There is a small increase in the diameter of the fuel injection pump and camshaft drive pulley/sprocket 4 compared to the conventional layout, and this is illustrated in FIGS. 7/8.

With a single drive system 31A the engine length can be reduced giving advantages in packaging the engine within the vehicle. Similarly the complexity of two drive systems requiring the maintenance of two tensioning systems (instead of one) is avoided.

FIGS. 9 and 10 similarly show the advantages of employing the variable timing devices G in a V-type engine.

Figure 11:
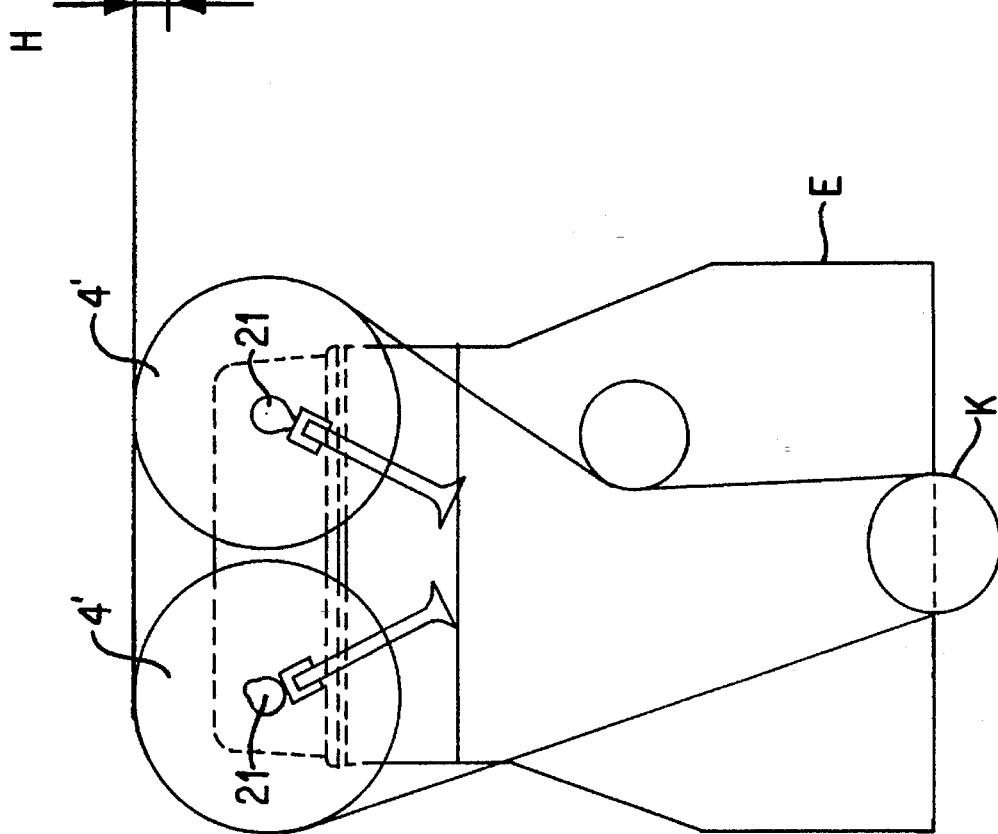
FIG. 11—shows in front view a cylinder head arrangement of a prior art I.C. engine of double-overhead camshaft design.

On a double overhead camshaft drive it is usual to have the camshafts disposed as shown in FIG. 11. The camshaft centers are determined by the diameter of the drive pulleys/sprockets 4' which are adjacent. In turn the diameter of the pulleys/sprockets 4' is fixed at twice the diameter of the crankshaft pulley/sprocket K for a 4-stroke engine. The height of the engine is also usually determined by the diameter of these pulleys/sprockets 4'.

Figure 12:
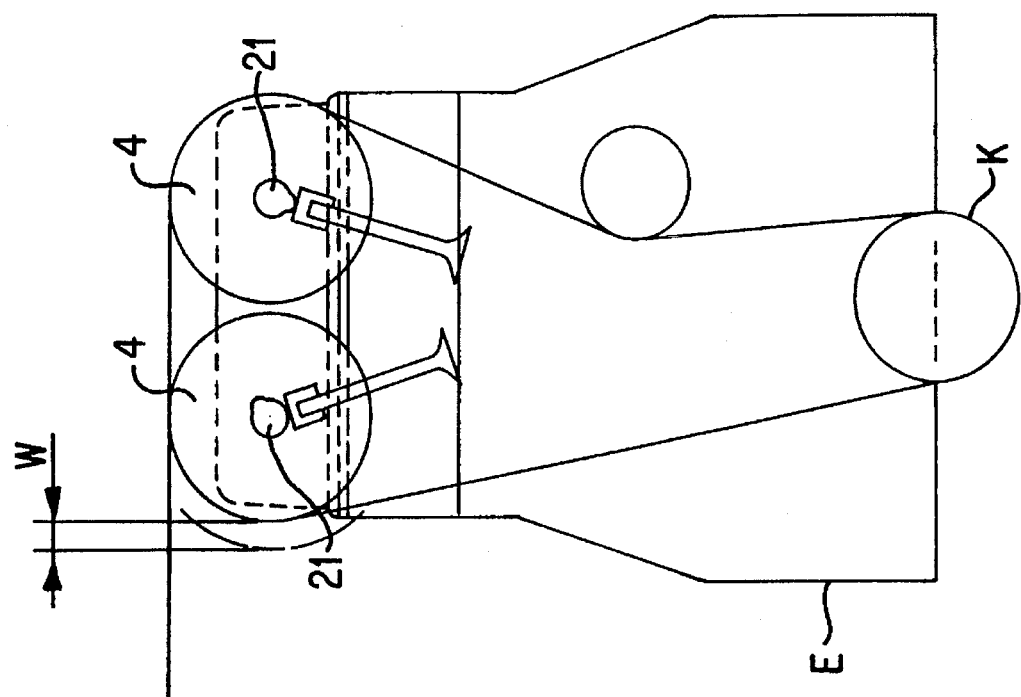
FIG. 12—shows a view comparable to FIG. 11 but for a compact I.C. engine using devices of the present invention.

The same layout with the variable timing device G fitted to both camshafts 21 can allow the diameter of the camshaft drive pulley/sprockets 4' to be reduced and this is shown in FIG. 12. Although this would mean the camshaft drive pulleys/sprockets 4 will be operating at a higher speed, the correct ratio of camshaft speed to crankshaft speed of 1:2 is recovered by the speed step-down facility within the variable timing device G.

Thus it can be seen from FIGS. 11/12 that there are advantages in that the camshaft centers can be shortened if desired and the overall engine envelope/height can be reduced, i.e. by dimensions H and 2W indicated in FIGS. 11/12.

An advantage that stems from reducing camshaft centers is that more flexibility in determining inlet and exhaust valve inclination is achieved which should lead to better engine performance. The reduction in engine height leads to better engine packaging, particularly with regard to passenger car under bonnet clearances.

In the arrangements of FIGS. 8, 10 and 12 it would be possible to dispense with the angular phase adjustment provided by the lever 14 in the variable timing devices. Also, in these Figures, as an alternative, it may be possible to have step-up variable gear devices at the high speed components instead of the step-down device at the low speed components still with only a single drive system (belt) employed. This could be achieved in the epicyclic gear 1 by having the annulus gear 11 as the input and the sunwheel assembly 3 as the output. The actual speed change obtained from the gear 1 could be selected as appropriate, and for some components such as engine superchargers a higher step-up gear may be required.

I claim:

1. An engine and gear drive combination including a gear device for an engine component driven by a drive system from an engine drive shaft, said gear device being adapted for location in said drive system and means being provided to locate the gear device close to said component, the gear device comprising: an input element driven from the engine drive shaft and an output element coupled to a driven shaft of the component, wherein the gear device serves to step the drive speed between the input and output elements, wherein one of said input and output elements comprises a sunwheel assembly while the other comprises an annulus gear, said sunwheel assembly and said annulus gear being connected by planet gears mounted on a planet carrier, the planet carrier having a control means including a lever for providing angular adjustment between the sunwheel assembly and the annulus gear, wherein the lever is connected to the planet carrier and angular adjustment between the sunwheel assembly and the annulus gear is effected by movement of the lever in a direction normal to the axis of rotation of the planet carrier.

2. An engine and gear drive combination as claimed in claim 1, wherein the gear drive operates in a step-down mode.

3. An engine and gear drive combination as claimed in claim 1, wherein the planet carrier is mounted on a sleeve extending concentrically with the driven shaft of the component and away from the component.

4. An engine and gear drive combination as claimed in claim 1, wherein operation of the lever is effected by sensing means sensing operating parameters of the engine.

5. An engine and gear drive combination as claimed in claim 1, wherein the annulus gear comprises a hub having a radial member to which an annulus is attached, the hub being adapted to be secured to the driven shaft of the component.

6. An engine and gear drive combination as claimed in claim 1, wherein the annulus gear can be secured to a radial member integral with said driven shaft of the component.

7. An engine and gear drive combination as claimed in claim 1, wherein the gear device is arranged such that the lever of the control means connects with the planet carrier at a position close to the front of the gear device.

8. An engine and gear drive combination as claimed in claim 7, wherein the lever of the control means is connected to a sleeve of the planet carrier.

9. An engine and gear drive combination as claimed in claim 1, wherein the engine is an internal combustion engine.

10. An engine and gear drive combination as claimed in claim 9, wherein the engine component to which the gear device is coupled is a fuel pump.

11. An internal combustion engine including a number of low-speed engine components including a camshaft and a fuel injection pump, and a number of high-speed engine components including a water pump and an alternator, wherein all of said components are driven by the engine drive shaft by a single belt drive means and each of one of the low-speed components and the high-speed components is provided with a separate, additional gear device which alters its input speed from that imparted by the belt drive means.

12. An internal combustion engine as claimed in claim 11, wherein each gear device comprises an input element driven from the engine drive shaft and an output element coupled to a driven shaft of the component, each gear device serves to step the drive speed between the input and output elements, one of said input and output elements comprises a sunwheel assembly while the other comprises an annulus gear, said sunwheel assembly and the annulus gear being connected by planet gears mounted on a planet carrier.

13. An internal combustion engine as claimed in claim 12, wherein the planet carrier of each gear device has a control means including a lever for providing angular adjustment between the sunwheel assembly and annulus gear, wherein the lever is connected to the planet carrier and angular adjustment between the sunwheel assembly and annulus gear is effected by movement of the lever in a direction normal to the axis of rotation of the planet carrier.

14. An internal combustion engine comprising:
(A) a drive shaft;
(B) a plurality of low-speed engine components including a camshaft and a fuel injection pump;
(C) a plurality of high-speed engine components including a water pump and an alternator;
(D) a single belt drive device connecting said drive shaft to said low-speed engine components and to said high-speed engine components; and
(E) a plurality of gear devices, corresponding in number to the number of one of said low-speed components and said high-speed components driven by said belt drive device, wherein a first one of said gear devices is connected to said belt drive device and to a first engine component comprising one of said camshaft and said water pump, said first gear device altering an input speed imparted to said first engine component from said belt drive device, and wherein a second one of said gear devices is connected to said belt drive device and to a second engine component comprising one of said fuel injection pump and said alternator, said second gear device altering an input speed imparted to said second engine component from said belt drive device.

15. An internal combustion engine as claimed in claim 14, wherein said first engine component includes a driven shaft, and wherein said first gear device includes
(1) an input element driven by said belt drive device and comprising one of a sunwheel assembly and an annulus gear;
(2) an output element coupled to said driven shaft of said first engine component and comprising the other of said sunwheel assembly and said annulus gear;
(3) a planet carrier; and
(4) planet gears mounted on said planet carrier and connecting said sunwheel assembly and said annulus gear to one another.

16. An internal combustion engine as claimed in claim 15, wherein
(1) said gear device further comprises a lever which is connected to said first planet carrier and which permits angular adjustment between said sunwheel assembly and said annulus gear, and
(2) said angular adjustment is effected by rotation of said lever about an axis parallel to an axis of rotation of said planet carrier.

17. An internal combustion engine as claimed in claim 16, further comprising a sensor which senses an operational parameter of said engine, and wherein said first gear device further comprises a drive device which angularly displaces said lever in response to operation of said sensor.

18. An internal combustion engine as claimed in claim 16, wherein said first gear device further comprises a sleeve on which said planet carrier is mounted and which extends concentrically with said driven shaft of said first engine component and away from said first engine component.

19. An internal combustion engine as claimed in claim 18, wherein said lever is connected to said planet carrier at a location close to a front of said first gear device.

20. An internal combustion engine as claimed in claim 15, wherein said first gear device further comprises a sleeve on which said planet carrier is mounted and which extends concentrically with said driven shaft of said first engine component and away from said first engine component.

21. An internal combustion engine as claimed in claim 15, wherein said annulus gear comprises (1) a gear and (2) a hub which is secured to said driven shaft of said first engine component and which has a radial member to which said gear is attached.

22. An internal combustion engine as claimed in claim 15, wherein
(1) said first gear device further comprises a radial member formed integral with said driven device of said first engine component, and
(2) said annulus gear is secured to said radial member.

23. An internal combustion engine as claimed in claim 14, wherein said first engine component is said camshaft and said gear device serves to step down said input speed.

24. An internal combustion engine as claimed in claim 14, wherein said belt drive device comprises a belt.

25. A method comprising:
(A) providing an internal combustion engine including
(1) a drive shaft,
(2) a plurality of low-speed engine components including a camshaft and a fuel injection pump,
(3) a plurality of high-speed engine components including a water pump and an alternator;
(B) driving said drive shaft to rotate via operation of said internal combustion engine;
(C) transferring torque from said drive shaft to said plurality of said low-speed engine components and to said plurality of said high-speed engine components from a single belt drive device; and
(D) altering an input speed imparted to all of one of said low-speed engine components and said high-speed engine components from said belt drive device, using a plurality of gear devices which correspond in number to the number of said one of said low-speed engine components and said high-speed engine components driven by said belt drive device, wherein a first one of said gear devices connects said belt drive device to a first one of said engine components comprising one of said camshaft and said water pump, and wherein a second one of said gear devices connects said belt drive device to a second one of said engine components comprising one of said fuel injection pump and said alternator.

26. A method as claimed in claim 25, wherein said step (D) comprises
   (1) driving an input element of said first gear device by said belt drive device, said input element comprising one of a sunwheel assembly and an annulus gear;
   (2) driving planet gears of said first gear device by said input element, said planet gears being mounted on a planet carrier; and
   (3) driving an output element of said first gear device by said planet gears, said output element being coupled to a driven shaft of said first engine component and comprising the other of said sunwheel assembly and said annulus gear.

27. A method comprising:
   (A) providing an internal combustion engine including
      (1) a drive shaft,
      (2) a low-speed engine component including one of a camshaft and a fuel injection pump, and
      (3) a high-speed engine component including one of a water pump and an alternator;
   (B) driving said drive shaft to rotate via operation of said internal combustion engine;
   (C) transferring torque from said drive shaft to said low-speed engine component and said high-speed engine component from a single belt drive device; and
   (D) altering an input speed imparted to a first engine component from said belt drive device using a gear device connecting said belt drive device to said first engine component, said first engine component comprising one of said low-speed engine component and said high-speed engine component, said step (D) including
      (1) driving an input element of said gear device by said belt drive device, said input element comprising one of a sunwheel assembly and an annulus gear,
      (2) driving planet gears of said gear device by said input element, said planet gears being mounted on a planet carrier,
      (3) driving an output element of said gear device by said planet gears, said output element being coupled to a driven shaft of said first engine component and comprising the other of said sunwheel assembly and said annulus gear; and
   (E) angularly displacing said sunwheel assembly and said annulus gear relative to one another by rotating a lever about an axis of rotation which is parallel to an axis of rotation of said planet carrier, said lever being connected to said planet carrier.

28. A method as claimed in claim 27, further comprising
   (A) sensing an operational parameter of said engine, and
   (B) operating a drive device, in response said sensing step, to angularly displace said lever.

29. An internal combustion engine comprising:
   (A) a drive shaft;
   (B) a driven shaft of an engine component;
   (C) a belt drive device connecting said drive shaft to said driven shaft; and
   (D) a gear device which is connected to said belt drive device and to said driven shaft, said gear device altering an input speed imparted to said driven shaft, wherein said gear device includes
      (1) an input element driven by said belt drive device and comprising one of a sunwheel assembly and an annulus gear,
      (2) an output element coupled to said driven shaft of said first engine component and comprising the other of said sunwheel assembly and said annulus gear,
      (3) a planet carrier,
      (4) planet gears mounted on said planet carrier and connecting said sunwheel assembly and said annulus gear to one another, and
      (5) a lever which is connected to said planet carrier and which permits angular adjustment between said sunwheel assembly and said annulus gear by rotation of said lever about an axis parallel to an axis of rotation of said planet carrier.

* * * * *